US012601414B2

(12) United States Patent
Tong

(10) Patent No.: US 12,601,414 B2
(45) Date of Patent: Apr. 14, 2026

(54) PRESSURE BALANCED POPPETT WITH CHECK

(71) Applicant: Fox Factory, Inc., Duluth, GA (US)

(72) Inventor: Ivan Tong, San Diego, CA (US)

(73) Assignee: Fox Factory, Inc., Duluth, GA (US)

( * ) Notice: Subject to any disclaimer, the term of this patent is extended or adjusted under 35 U.S.C. 154(b) by 966 days.

(21) Appl. No.: 17/848,218

(22) Filed: Jun. 23, 2022

(65) Prior Publication Data

US 2022/0412477 A1     Dec. 29, 2022

Related U.S. Application Data

(60) Provisional application No. 63/215,395, filed on Jun. 25, 2021.

(51) Int. Cl.
*F16F 9/34*     (2006.01)
*F16K 17/04*     (2006.01)
*F16F 9/19*     (2006.01)

(52) U.S. Cl.
CPC .............. *F16K 17/048* (2013.01); *F16F 9/34* (2013.01); *F16F 9/19* (2013.01); *F16K 17/0433* (2013.01)

(58) Field of Classification Search
CPC .......... F16K 1/54; F16K 17/105; F16K 17/10; F16K 17/048; F16K 17/0433; F16K 17/065; F16K 17/025; F16K 15/025; F16K 15/026; F16F 9/34; F16F 9/325
See application file for complete search history.

(56) References Cited

U.S. PATENT DOCUMENTS

| | | | | |
|---|---|---|---|---|
| 3,312,445 A | * | 4/1967 | Trombatore ............ | F16K 31/40 |
| | | | | 251/129.21 |
| 3,578,018 A | * | 5/1971 | Dillon ..................... | F15B 11/02 |
| | | | | 137/489 |
| 4,706,932 A | * | 11/1987 | Yoshida .............. | F15B 13/0405 |
| | | | | 251/30.01 |
| 5,097,746 A | * | 3/1992 | Asaoka ................ | G05D 16/187 |
| | | | | 91/452 |
| 5,386,893 A | * | 2/1995 | Feigel ........................ | F16F 9/46 |
| | | | | 188/266.5 |
| 5,413,196 A | * | 5/1995 | Forster ..................... | F16F 9/46 |
| | | | | 188/266.8 |
| 5,464,079 A | * | 11/1995 | Lohberg .................. | F16F 9/465 |
| | | | | 188/315 |
| 5,588,510 A | * | 12/1996 | Wilke ..................... | F16F 9/465 |
| | | | | 188/315 |
| 5,890,568 A | * | 4/1999 | De Kock ................ | F16F 9/465 |
| | | | | 188/266.5 |
| 8,485,224 B2 | * | 7/2013 | Forster ................... | F16F 9/464 |
| | | | | 188/266.5 |
| 8,607,942 B2 | * | 12/2013 | Becker .................... | F16F 9/504 |
| | | | | 188/314 |
| 10,189,329 B2 | * | 1/2019 | Sakai ...................... | F16F 9/465 |

* cited by examiner

*Primary Examiner* — Nicholas J Lane

(57) ABSTRACT

Described herein is a pressure balanced valve comprising: an armature, wherein the armature has an inlet channel, at least one aperture, and a pressure feedback pin disposed within a hollow interior of the armature, a poppet slidably disposed within the hollow interior and around the pressure feedback pin to enable fluid communication between the pressure feedback pin and the poppet, the poppet and the pressure feedback pin cooperatively comprising the pressure balanced valve, wherein the poppet has at least one channel therethrough, and a biasing spring fit to bias the poppet towards closing the inlet channel.

14 Claims, 7 Drawing Sheets

PRESSURE BALANCED POPPETT WITH CHECK

CROSS-REFERENCE TO RELATED APPLICATIONS

This application claims benefit of U.S. Provisional Patent Application Ser. No. 63/215,395, filed Jun. 25, 2021, entitled "PRESSURE BALANCED POPPET WITH CHECK" by Ivan Tong, assigned to the assignee of the present application, which is herein incorporated by reference in its entirety.

BACKGROUND ART

Shock absorbers (e.g., dampers) are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more dampers, the impact force can be significantly reduced or even absorbed completely before it is transmitted to a person on a seat of the vehicle.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

Typical shock absorbers consist of at least a cylinder with an inner diameter, a rod movably disposed within the cylinder, and a main damping piston coupled to the rod. The main damping piston is configured to divide the cylinder into a compression side and a rebound side.

Such shock absorbers may be monotube, or two concentric cylinders. The main damping piston may be vented or solid. Internal bypasses or external bypasses may also be present. Some shock absorbers have an external reservoir with a bladder or floating piston.

BRIEF DESCRIPTION OF THE DRAWINGS

Aspects of the present invention are illustrated by way of example, and not by way of limitation, in the accompanying drawings, wherein.

DETAILED DESCRIPTION OF THE EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

The following embodiments of the present invention outline controlling fluid flow. It should be understood that while the embodiments may be referred to as being part of a shock absorber, the present invention is easily applicable to other situations, and should not be limited to suspension systems.

In previously used fluid flow control systems, a two stage hydraulics system might be utilized in which a valve would apply a preload directly to a set of shims. This structure resulted in issues with overshoot, where the compression chamber would build more pressure than intended before the valve could open. Pressure would build up due to the valve essentially hydro locking in a closed position due to slow drainage of the fluid used to maintain the closed position, and the hydraulic chamber essentially acting like a damper.

Instances that would cause the previous structure to hydro lock closed would be sudden changes in terrain, for example riding along a smooth path and hitting a tree root, or similar sudden square edge situations.

In other previous designs, such square edge situations would cause similar issues. For instance, in standard poppet valves there would be issues with overshooting, as well as the valve closing prematurely and oscillating.

Such previous poppet designs had this issue as a result of a high fluid flow rate creating a decrease in pressure such that there would no longer be enough force to keep the poppet valve open. Once the valve began to close, the force would once again build up to open the poppet valve. This cycle would repeat, causing oscillation of the valve. This would then lead to the rider to feel unexpected responses and have a generally harsher riding experience.

Additionally, previous valve designs can be complex and harder to manufacture, leading to increased costs. The present invention aims to simplify the design, solve overshoot issues, and stop unintended oscillation.

Figure 1:
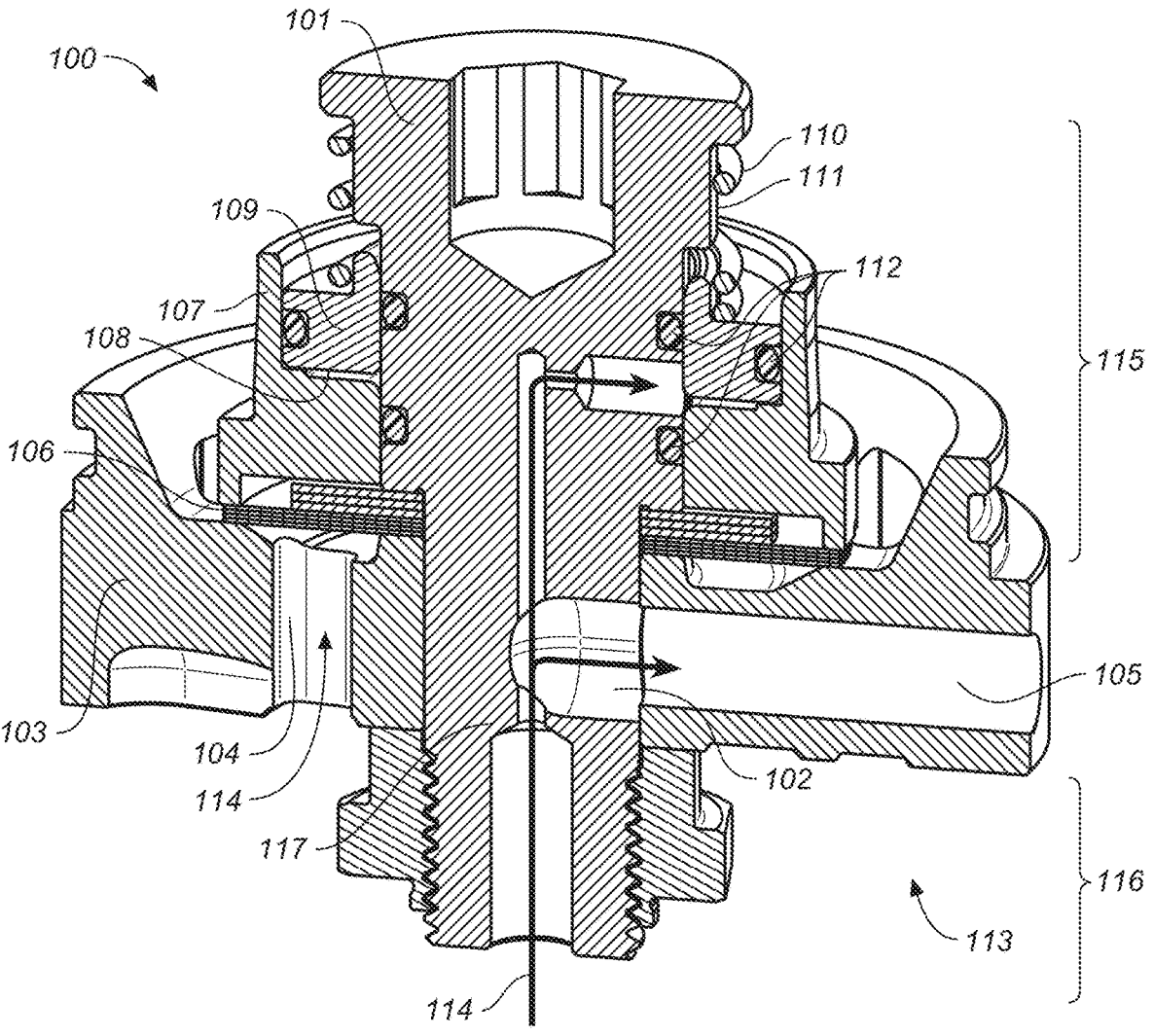
FIG. 1 shows a cutaway of a two-stage hydraulic boost valve.

FIG. 1 shows a cutaway of a two-stage hydraulic boost valve 100. In this embodiment, fluid would flow along flow path 114. For simplicity, the direction indicated by arrow 113 will be referred to as up, upward, top, etc., but it should be understood that any orientation is possible.

Two stage hydraulic boost valve 100 has a central structure 101, in which chamber 102 is formed. Around the central structure 101 is main piston 103 through which vent 104 is formed, along with pilot chamber 105 which is fluidly coupled with chamber 102. While a single vent 104 is shown, it should be understood that multiple vents may be utilized. Shim stack 106 covers the top end of vent 104. Shims 106 are abutted by boost valve 107, which partially forms gap 108. By default, gap 108 is fluidly coupled with chamber 102. Gap 108 is also partially formed by piston 109. Spring 110 extends between a ledge formed by the outer edge of central structure 101 and piston 109, exerting a downward force on piston 109. As boost valve 107 and piston 109 are moved up, spring 110 will be compressed. Boost valve 107 and piston 109 are limited in their upward movement by ledge 111. O-rings 112 act to seal select parts.

As fluid is pressurized in lower chamber 116, the fluid will flow along flow path 114 through vent 104 and chamber 102. Fluid may then flow through pilot chamber 105, and to a pilot valve (not shown). At a certain threshold, the fluid may then pass through the pilot valve and to upper chamber 115. Shims 106 will act to prevent fluid below a certain pressure threshold from flowing into upper chamber 115. Once the fluid pressure is above the specified threshold, shims 106 will give and allow the fluid to pass. While the shims 106 have a base threshold based on their material properties and configuration, boost valve 107, piston 109, and spring 110 work to exert a preload on shims 106 such that the pressure threshold may vary based on the fluid flow rate.

The variation in pressure threshold is achieved by the fluid that flows through pilot inlet orifice 117, to chamber 102, and into gap 108. Pilot inlet orifice 117 acts to control the pressure in chamber 102.

During steady state operations, the pressure exerted against boost valve 107 from the fluid in gap 108 will result in the boost valve 107 having slightly different positions. In highly transient situations, the boost valve 107 needs more time to reach a steady state position.

Upon a sudden square edge event, the current embodiment will not hydro lock in a closed position like previous inventions would. Instead, a strong enough fluid pressure from lower chamber 116 would open shims 106 which would push boost valve 107 and piston 109 up, compressing spring 109. With a strong enough force, piston 109 may hit ledge 111 causing upward movement to cease.

In this embodiment, gap 108 would not have to drain fluid before allowing boost valve 107 and piston 109 to move. As such, boost valve 107 and piston 109 are able to move without gap 108 experiencing a change in volume.

This embodiment also allows for high frequency vibrations to be filtered out, allowing for a smoother ride.

Figure 2:
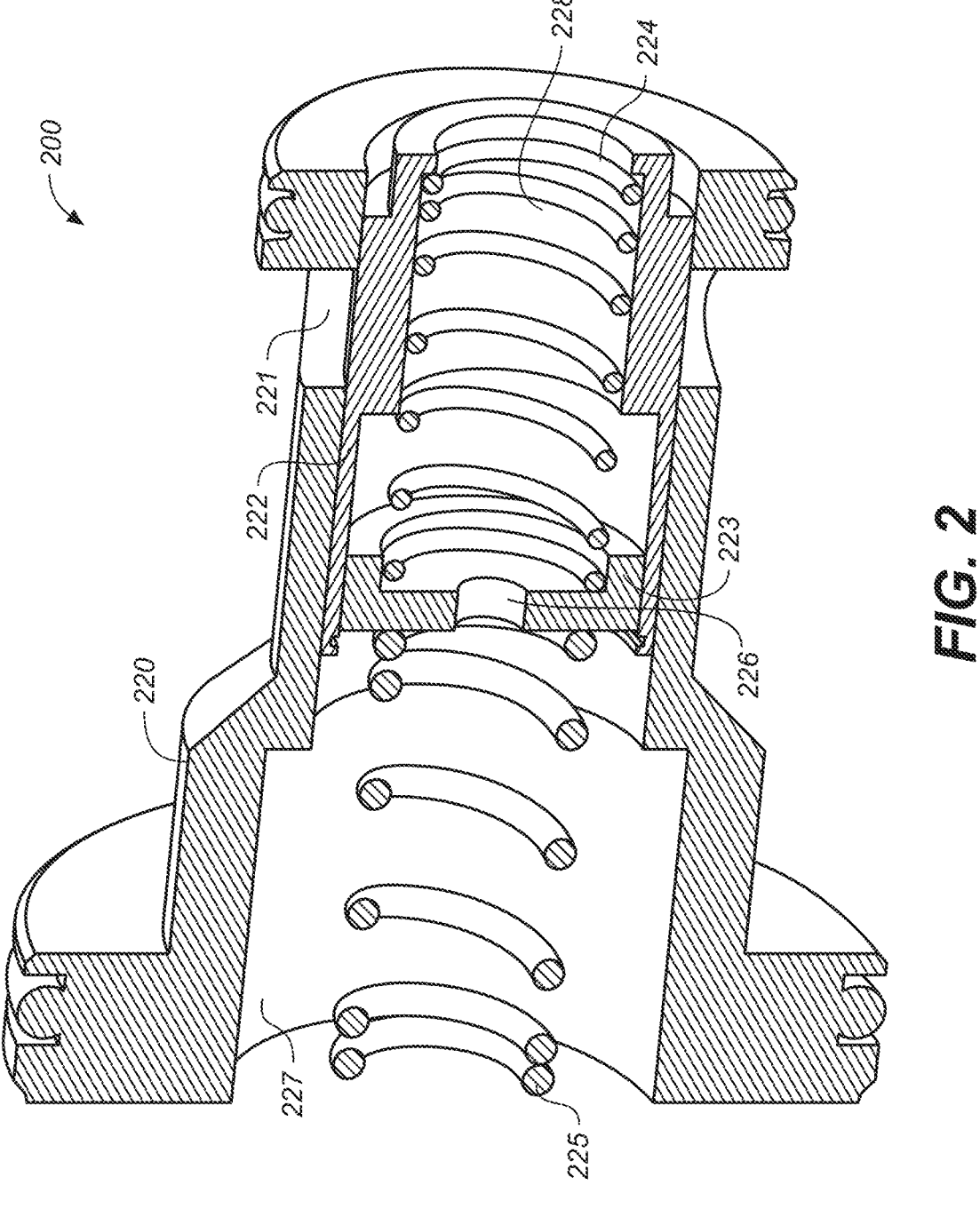
FIG. 2 shows a cutaway view of a sliding spool valve.

FIG. 2 shows a cutaway view of a sliding spool valve 200. Sliding spool valve 200 consists of an outer body 220, through which a bleed window 221 is formed, a spool skirt 222, a spool piston 223, a spool skirt spring 224, and a pilot spring 225. Spool piston 223 has a central orifice 226. Pilot spring 225 is found to the left of spool piston 223 in the pilot chamber 227, whereas spool skirt spring 224 is found to the right of spool piston 223 in the inlet chamber 228. It should be understood that the terms left and right are used for brevity and clarity, and that any orientation of the invention may apply.

In the present embodiment, no O-rings are required as the sliding surfaces are of a very smooth finish, and have a tight enough tolerance to prevent fluid leakage.

In one embodiment, the spool skirt 222 acts like a directional bleed, when the spool skirt spring 224 is very light. Spool skirt 222 and spool piston 223 have an effective area that feels pressure from the inlet chamber 228, as well as an effective area that feels pressure from the pilot chamber 227. With the combined fluid pressure and spring forces, spool skirt 222 and spool piston 223 have a default position where spool skirt prevents fluid flow through bleed window 221.

While in use, pressure in the inlet chamber 228 acts to push spool skirt 222 and spool piston 223 towards pilot chamber 227, such that fluid is allowed to flow through bleed window 221.

In one embodiment, the pilot spring 225 is stiffer than the spool skirt spring 224. In this embodiment, the assembly acts like a collapsible spool that may move quickly to accommodate large transients in flow rate from the inlet chamber 228.

4

Figure 3:
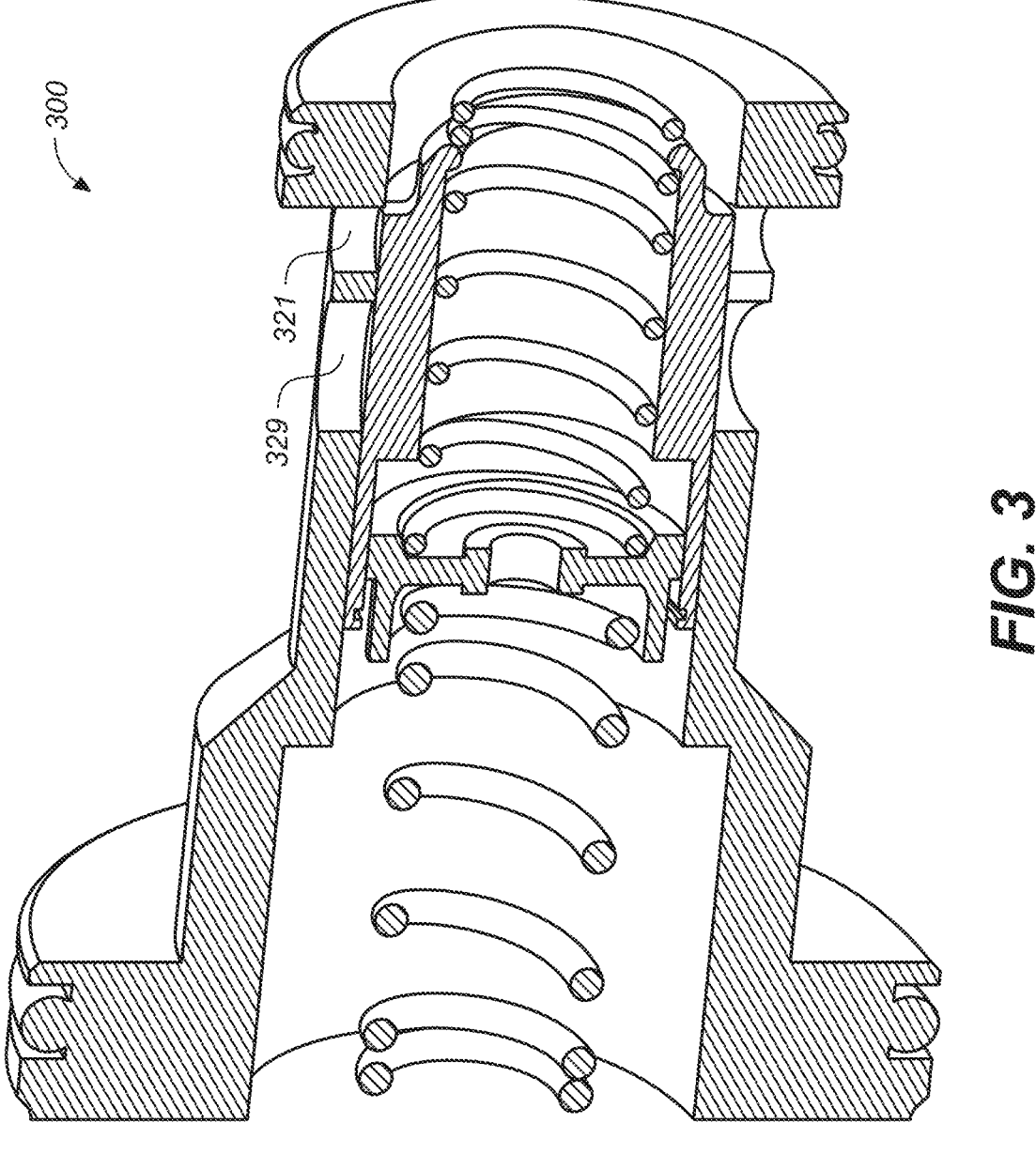
FIG. 3 shows a cutaway view of an alternate sliding spool valve.

FIG. 3 shows a cutaway view of an alternate sliding spool valve 300. In this embodiment, sliding spool valve 300 has a secondary bleed window 329 along with bleed window 321. Spool piston 223 is also of a slightly different configuration.

Figure 4:
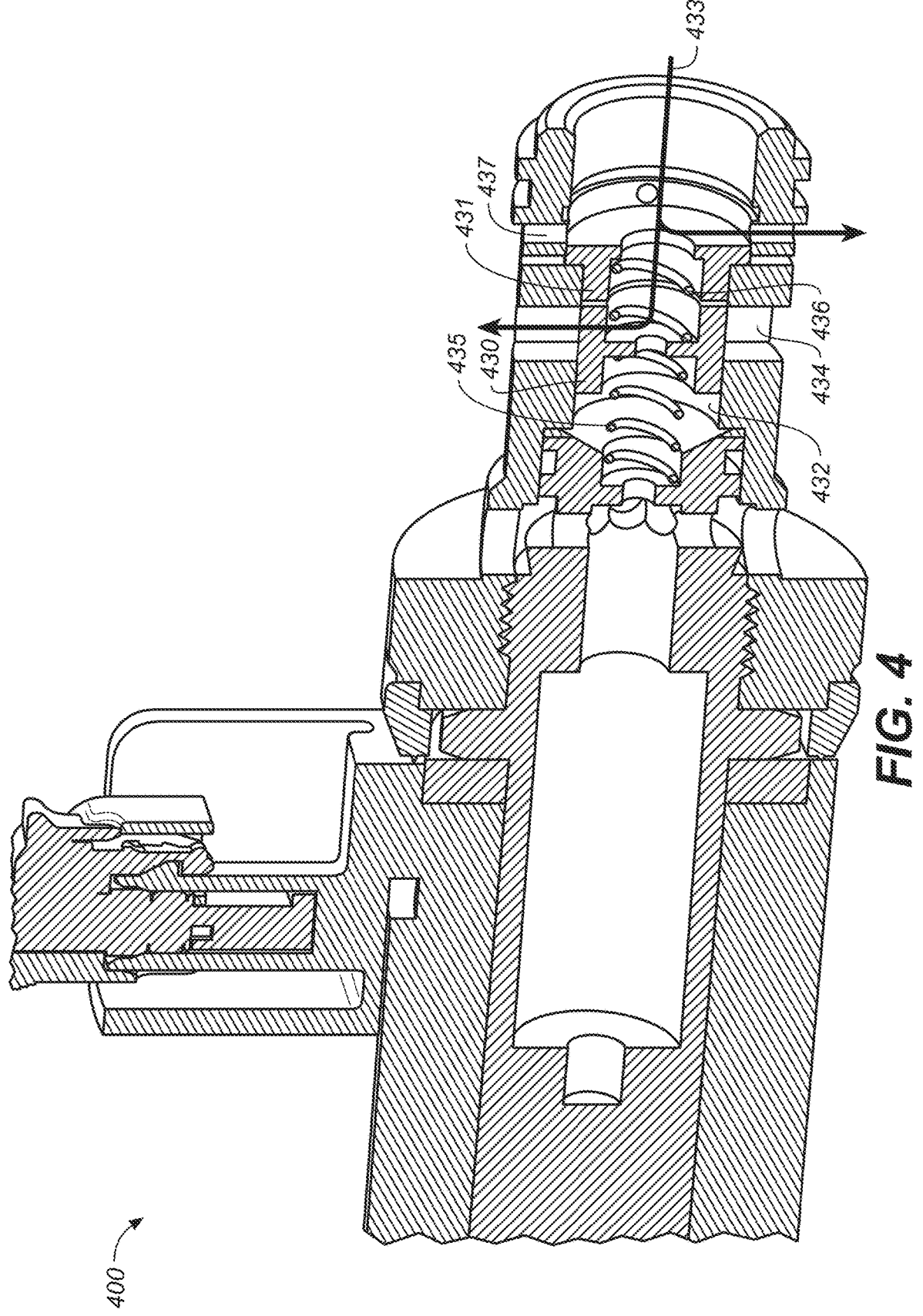
FIG. 4 shows a cutaway view of a two-piece spool.

FIG. 4 shows a cutaway view of a two-piece spool 400. In this embodiment, there is a main stage spool 430 and a bleed spool 431. These two spools have apertures that allow fluid to flow through the spools and into pilot chamber 432. Main spring 435 and bleed spring 436 are present.

Through the use of the spools 430, 431 and springs 435, 436, pilot chamber 432 can undergo a similar hydro locking effect as other embodiments of the present invention. In this case, the present embodiment would lock in an open state.

In one embodiment, there is an accumulator in pilot chamber 432 (not shown).

Arrow 433 shows the fluid flow path. When fluid flows at the proper rate, the main stage spool 430 will slide such that fluid is allowed to flow out through windows 434. Prior to windows 434 opening, fluid can flow through bleed windows 437. It should be understood that more or fewer iterations of windows 434 and 437 may be used than what is shown.

In one embodiment, bleed spring 436 has a low spring constant such that bleed spool 431 is allowed to move relatively freely and act like a directional bleed, allowing flow to go through. Once pressure in pilot chamber 432 builds up to a certain threshold, main stage spool 430 will then act through bleed spring 436 to push bleed spool 431 and close off the directional bleed.

Bleed spool 431 acts to mitigate overshoot pressure issues.

One benefit of this embodiment is that the complexities of high tolerancing, the need for O-rings, or potential friction issues with O-rings and tolerancing are eliminated. The initial transient response, and similarly frequency response, are also improved.

Figure 5:
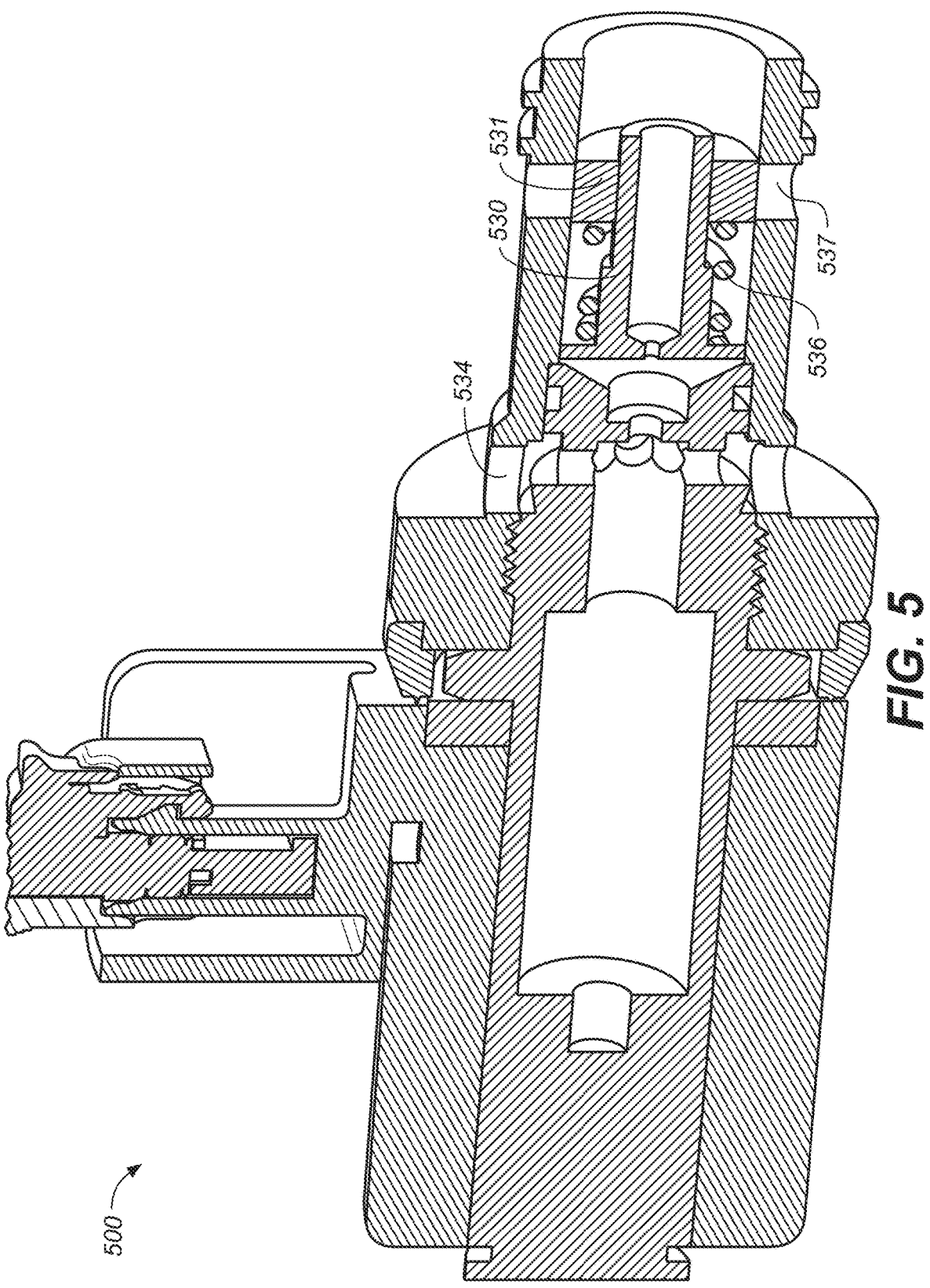
FIG. 5 shows a cutaway view of an alternate two-piece spool.

FIG. 5 shows a cutaway view of an alternate two-piece spool 500. In this embodiment, bleed spool 531 is now disposed around main spool 530, with bleed spring 536 biasing bleed spool 531. With this design, once fluid pressure overcomes the force of bleed spring 536, bleed spool 531 will move to expose bleed windows 537. Otherwise, fluid may flow through main spool 530, through pilot chamber 532, and exit the valve through windows 534.

In one embodiment, a spring with a high spring constant is disposed between the pilot seat and the main spool 530. In this embodiment, an additional check spool (not shown) would be included to cover the ports and provide extra resistance.

Figure 6:
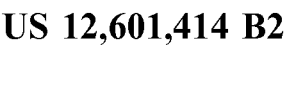
FIG. 6 shows a cutaway view of a pressure balanced poppet valve.

FIG. 6 shows a cutaway view of a pressure balanced poppet valve 600. The pressure balanced poppet valve consists of armature 638, in which is formed hollow 642, inlet channel 639, apertures 640, and pressure feedback pin 641. Pressure feedback pin 641 extends into hollow 642, and through the center of poppet 643. Biasing Spring 644 is disposed between poppet 643 and a surface of hollow 642.

The pressure feedback pin 641 acts to change the working area for fluid pressure.

In one embodiment, biasing spring 644 normally biases poppet to a closed position, however it should be understood that a normally open poppet may also be used. In one embodiment, a coil (not shown) is disposed to energize and reduce the preload of the biasing spring 644.

In one embodiment, poppet 643 has channels 645 to allow fluid to flow through the poppet. While two channels 645 are shown, the number of channels is allowed to vary.

The poppet 643 is slidably disposed around the pressure feedback pin 641 within the hollow interior 642 of the armature 638. In use of the pressure balanced valve 600, fluid communication between the pressure feedback pin 641 and the poppet 643 is enabled. Together, the pressure feedback pin 641 and the poppet 643 act to cooperatively comprise the pressure balanced valve 600.

Without pressure balancing a poppet, the pressure feedback area is the same as the flow area. By pressure balancing, a large flow area is maintained, but the pressure feedback area is reduced. Flow path 646 shows how fluid typically flows through the poppet valve.

The armature 638 is nominally surrounded by the exit pressure, which assists in mitigating any premature closing or oscillation caused by pressure drops from fast flow rates.

Figure 7:
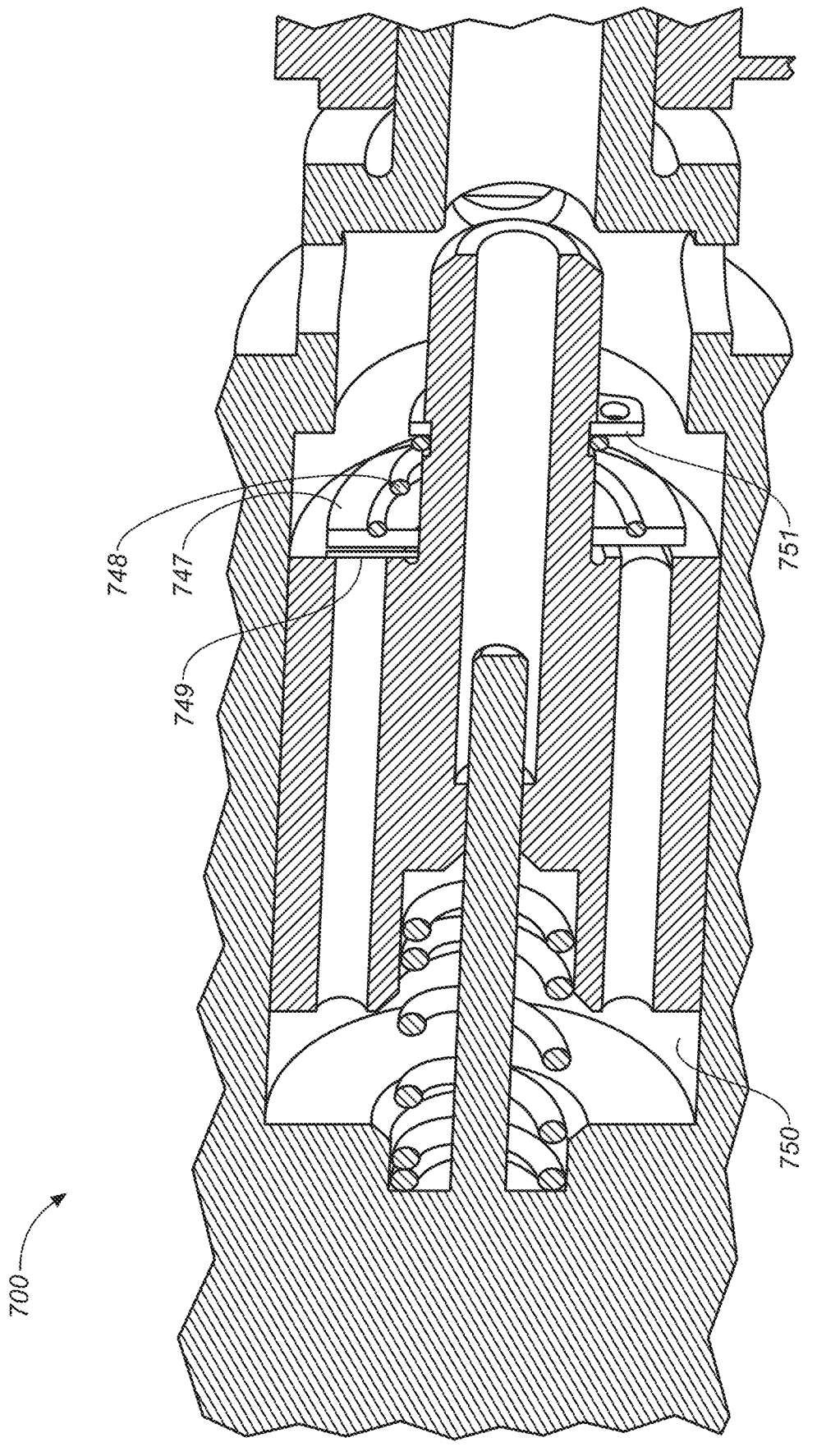
FIG. 7 shows a cutaway view of a check shim pressure balanced poppet valve.

FIG. 7 shows a cutaway view of a check shim pressure balanced poppet valve 700. Check shim pressure balanced poppet valve 700 is generally similar to pressure balanced poppet valve 600, but has the addition of check shim 747, shim spring 748, and bleed shim 749. It should be understood that alternate embodiments given for check shim pressure balanced poppet valve 700 may apply to pressure balanced poppet valve 600 and vise versa.

In this embodiment, chamber 750 essentially hydro locks in an open position when the fluid flow rate is fast, and pressure would decrease. Due to the check shims limiting fluid flow into chamber 750, poppet 643 is slow to return to a closed position, which solves the problem previous designs had of the poppet valve oscillating. Chamber 750 is allowed to drain quickly due to the direction of the check shims 747, which prevents overshoot and similar transient responses.

Bleed shim 749 does allow for fluid to enter chamber 750. In another embodiment, bleed shim 749 is not present, and instead a groove or flow path (not shown) is formed in armature 638.

In one embodiment stopper 751 is present to hold check spring 748 in place. In one embodiment, a grove or ledge is formed in poppet 643 to hold check spring 748 in place.

Disk 652 is present to assist in fluid flow management, such that inlet channel 639 of armature 638 is used as an inlet, and apertures 640 as an outlet.

In one embodiment, the valve is utilized between the main chamber and an external reservoir, but it should be understood that the primary use is to control fluid flow, and as such the location may vary. For instance, in another embodiment the valve is used in the main damping chamber.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

6

What is claim is:

1. A pressure balanced valve comprising:
an armature, wherein said armature has an inlet channel, at least one aperture, and a pressure feedback pin disposed within a hollow interior of said armature;
a poppet slidably disposed within said hollow interior and around said pressure feedback pin to enable fluid communication between said pressure feedback pin and said poppet, wherein said poppet has at least one channel therethrough;
a biasing spring fit to bias said poppet towards closing said inlet channel;
a check shim disposed over said at least one channel of said poppet;
a shim spring to bias said check shim; and
a groove in said armature, wherein said groove allows limited flow in a direction opposite of what said check shim normally allows.

2. The pressure balanced valve of claim 1 further comprising:
a disk disposed around said inlet channel of said armature.

3. The pressure balanced valve of claim 1 further comprising:
a bleed shim disposed between said check shim and said at least one channel, said bleed shim to allow low fluid flow through said at least one channel in a direction opposite of what said check shim normally allows.

4. The pressure balanced valve of claim 1 wherein, said pressure balanced valve is disposed between an external reservoir and a main piston.

5. The pressure balanced valve of claim 1 wherein, if a fluid pressure from said inlet channel reaches a minimum threshold, said poppet will move to allow fluid flow.

6. The pressure balanced valve of claim 1 wherein, said at least one channel limits fluid flow such that said poppet essentially hydro locks in an open position.

7. A pressure balanced valve comprising:
an armature, wherein said armature has an inlet channel, at least one aperture, and a pressure feedback pin disposed within a hollow interior of said armature;
a poppet slidably disposed within said hollow interior and around said pressure feedback pin, wherein said poppet has at least one channel therethrough;
a biasing spring fit to bias said poppet towards closing said inlet channel;
a check shim disposed over said at least one channel of said poppet;
a shim spring to bias said check shim; and
a groove in said armature, said groove allows limited flow in a direction opposite of what said check shim normally allows.

8. The pressure balanced valve of claim 7 further comprising:
a disk disposed around said inlet channel of said armature.

9. The pressure balanced valve of claim 7 further comprising:
a bleed shim disposed between said check shim and said at least one channel, said bleed shim to allow low fluid flow through said channels in a direction opposite of what said check shim normally allows.

10. The pressure balanced valve of claim 7 wherein, if a fluid pressure from said inlet channel reaches a minimum threshold, said poppet will move to allow fluid flow.

11. The pressure balanced valve of claim 7 wherein, said at least one channel and said check shim limits fluid flow such that said poppet essentially hydro locks in an open position.

12. A pressure balanced valve comprising:

an armature, wherein said armature has an inlet channel, at least one aperture, and a pressure feedback pin disposed within a hollow interior of said armature;

a poppet slidably disposed within said hollow interior and around said pressure feedback pin, wherein said poppet has at least one channel therethrough;

a biasing spring fit to bias said poppet towards closing said inlet channel;

a check shim disposed over said at least one channel of said poppet;

a shim spring to bias said check shim; and a bleed shim disposed between said check shim and said at least one channel, said bleed shim to allow low fluid flow through said channels in a direction opposite of what said check shim normally allows.

13. The pressure balanced valve of claim 1 wherein, if a fluid pressure from said inlet channel reaches a minimum threshold, said poppet will move to allow fluid flow.

14. The pressure balanced valve of claim 13 wherein, said at least one channel and said check shim limits fluid flow such that said poppet essentially hydro locks in an open position.

* * * * *